（12）United States Patent
Bhavsar et al.

(10) Patent No.: US 11,393,043 B2
(45) Date of Patent: Jul. 19, 2022

(54) METHOD AND SYSTEM FOR CREATION AND FUNDING OF TAX-ADVANTAGED ACCOUNT AT POINT OF SALE/SERVICE

(71) Applicant: ConnectYourCare, LLC, Hunt Valley, MD (US)

(72) Inventors: Vrajesh Bhavsar, Franklin, TN (US); Jennifer Frankenfield, Mount Juliet, TN (US); Reese Feuerman, Columbia, MD (US)

(73) Assignee: CONNECTYOURCARE, LLC, Hunt Valley, MD (US)

( * ) Notice: Subject to any disclaimer, the term of this patent is extended or adjusted under 35 U.S.C. 154(b) by 557 days.

(21) Appl. No.: 15/958,937

(22) Filed: Apr. 20, 2018

(65) Prior Publication Data

US 2019/0325527 A1    Oct. 24, 2019

(51) Int. Cl.
*G06Q 40/00* (2012.01)
*G06Q 20/40* (2012.01)
*G06Q 40/06* (2012.01)
*G06Q 20/20* (2012.01)

(52) U.S. Cl.
CPC ......... *G06Q 40/10* (2013.01); *G06Q 20/4014* (2013.01); *G06Q 20/4037* (2013.01); *G06Q 40/06* (2013.01); *G06Q 20/20* (2013.01)

(58) Field of Classification Search
None
See application file for complete search history.

(56) References Cited

U.S. PATENT DOCUMENTS

| | | | |
|---|---|---|---|
| 6,108,641 A | 8/2000 | Kenna et al. | |
| 7,174,302 B2 | 2/2007 | Patricelli et al. | |
| 7,213,750 B1 * | 5/2007 | Barnes | G06Q 20/20 235/380 |
| 7,822,624 B2 | 10/2010 | Erdmann et al. | |
| 7,905,399 B2 | 3/2011 | Barnes et al. | |
| 7,922,083 B2 | 4/2011 | Harrison et al. | |
| 7,930,192 B1 | 4/2011 | Milanovich | |
| 8,051,006 B1 | 11/2011 | Rourk | |
| 8,297,498 B2 | 10/2012 | Vriheas et al. | |
| 8,660,862 B2 | 2/2014 | Patterson et al. | |
| 8,744,874 B2 | 6/2014 | Urich et al. | |
| 8,788,284 B2 | 7/2014 | Smith | |
| 9,576,323 B2 | 2/2017 | Yu et al. | |
| 2002/0035529 A1 | 3/2002 | Tooke, III | |
| 2006/0036523 A1 | 2/2006 | Stover | |

(Continued)

FOREIGN PATENT DOCUMENTS

WO    WO 2002/15080 A2    2/2002

*Primary Examiner* — Jason Borlinghaus
(74) *Attorney, Agent, or Firm* — Sterne, Kessler, Goldstein & Fox P.L.L.C.

(57) ABSTRACT

Disclosed herein are system, method, and computer program product embodiments describing the creation and funding of tax-advantaged accounts at a point of sale/service of a qualifying expense. The disclosure presents verifying the identity of the recipient of the qualifying expense, confirming an initial contribution, and creating a tax-advantaged account on behalf of the individual. The disclosure further presents funding the tax-advantaged account with the initial contribution and subsequently generating a bank transaction wherein the tax-advantaged account transfers the cost of the qualifying expense to the provider.

20 Claims, 8 Drawing Sheets

(56) References Cited

U.S. PATENT DOCUMENTS

| | | |
|---|---|---|
| 2006/0155631 A1 | 7/2006 | Kondaks |
| 2006/0200397 A1 | 9/2006 | Jasperse et al. |
| 2006/0212378 A1 | 9/2006 | Hoffman et al. |
| 2007/0011089 A1 | 1/2007 | DeSchryver |
| 2007/0050205 A1 | 3/2007 | Lieberman |
| 2007/0276703 A1 | 11/2007 | Mason et al. |
| 2008/0183627 A1 | 7/2008 | Harrison et al. |
| 2008/0191008 A1 | 8/2008 | Manfredi et al. |
| 2009/0063197 A1 | 3/2009 | Lisle |
| 2009/0132289 A1 | 5/2009 | Stenman et al. |
| 2010/0004955 A1 | 1/2010 | Telkamp et al. |
| 2010/0332247 A1 | 12/2010 | Spriggs |
| 2012/0054088 A1 | 3/2012 | Edrington et al. |
| 2013/0144783 A1 | 6/2013 | Bishop |
| 2013/0204638 A1* | 8/2013 | Lan .................. G06Q 40/02 705/2 |
| 2014/0006050 A1 | 1/2014 | Feinschreiber et al. |
| 2014/0379361 A1* | 12/2014 | Mahadkar ............ G06Q 20/40 705/2 |
| 2015/0095186 A1 | 4/2015 | Mekala et al. |

\* cited by examiner

METHOD AND SYSTEM FOR CREATION AND FUNDING OF TAX-ADVANTAGED ACCOUNT AT POINT OF SALE/SERVICE

BACKGROUND

A tax-advantaged account (TAA) is an account offering tax benefits or tax exemptions and may be, for example, a contribution funded account (CFA) such as a health savings account (HSA), health reimbursement arrangement (HRA), flexible spending account (FSA), individual retirement account (IRA), etc. TAAs may provide tax advantages to an account holder by allowing the account holder to deposit funds pre-tax into an account, to earn tax-free interest on those deposits, and to make tax-free withdrawals of those funds for qualified expenses, such as medical expenses. The amount that an account holder may contribute in a tax year may be capped based on the account type.

TAAs may be started by an employer and funded on behalf on an employee, or started by an individual in his/her individual capacity without an employer's assistance. For example, an individual starting an HSA may establish an HSA through a qualified HSA trustee. An individual starting a TAA may also need to meet certain eligibility criteria: e.g., for an HSA, an individual may need to possess a high deductible health plan, have no other disqualifying healthcare coverage, not be enrolled in Medicare, and not be named as a dependent on someone else's tax return. TAAs may comprise an investment or multiple investments that accrue interest over time. Management of TAAs and investments therein may be provided by a plan manager or plan administrator.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
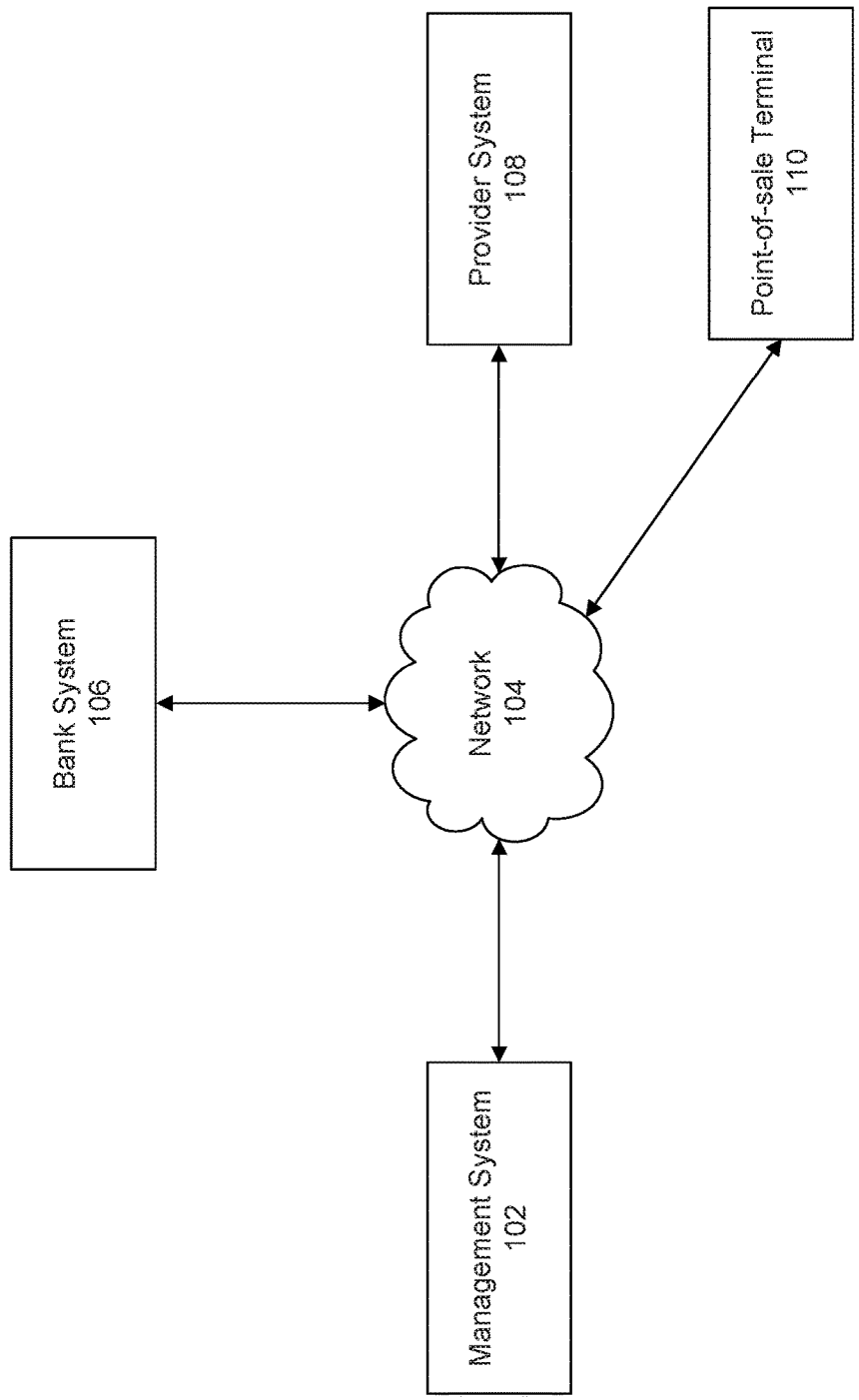
FIG. 1 is an example block diagram illustrating multiple systems of respective entities involved in creating and funding a TAA at a point of sale/service to pay for a qualifying expense, according to an example embodiment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant art(s) will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, these descriptions are merely for convenience, and these actions result from computing devices, processors, controllers, or other devices executing the firmware, software, routines, and/or instructions. Further, any implementation variations may be carried out by a general purpose computer, as described below.

Any reference to the term "module" shall be understood to include at least one of software, firmware, and hardware (such as one or more circuit, microchip, or device, or any combination thereof) or any combination thereof. In addition, those skilled in relevant art(s) will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant art(s), readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant art(s) in light of the teachings herein.

Provided herein are system, apparatus, device, method and/or computer program product embodiments, and/or combinations and sub-combinations thereof, for creating and funding TAAs at a point of sale/service to pay for a qualifying expense.

TAAs are accounts offering tax benefits or tax exemptions, e.g., CFAs, HSAs, HRAs, FSAs, IRAs, etc. TAAs may comprise one or more investments such as bonds, stocks, mutual funds, annuities, money market accounts, bank accounts, or other suitable assets. An individual may set up a TAA to cover qualified expenses or other qualifying expenses. For example, an individual may set up a TAA through their employer. Depending on the TAA type, the TAA may be employer funded, employee funded, or both employer and employee funded. The plan selected by the individual may allow the individual to contribute a portion of their pre-tax earnings at the end of each pay period to fund the TAA. The individual may also make ad-hoc contributions to a TAA.

An individual may also open and fund a TAA outside of the context of an employer/employee relationship. For example, an individual may open and fund an HSA through a qualified HSA trustee. The account holder may need to meet additional qualifying conditions. For example, an individual starting an HSA may need to have a high deductible health plan, have no other healthcare coverage, and not be enrolled in Medicare. Other qualifying conditions may apply depending on the TAA type. An account holder may contribute to a self-started TAA through ad-hoc payments, on a schedule set by a plan manager or administrator, or other suitable method.

Eligibility restrictions establish the qualified expenses in the benefit plan for a TAA. For example, a qualified medical expense may be a medical, dental, or other suitable expense that qualifies for an itemized deduction of an account holder's taxes. A qualified medical expense may include, but not be limited to, the cost of diagnosis, cure, mitigation, treatment, or prevention of disease, such as payment for legal medical services rendered by physicians, pharmacists, dentists, and other medical practitioners and the related costs of equipment, supplies, therapeutics, and diagnostic devices. A qualified medical expense may be incurred by an account holder, an account holder's spouse, or any dependents claimed by the account holder on a tax return. Other eligibility restrictions may apply to other TAA types.

A TAA may be incorporated into a management system comprising multiple TAAs (e.g., CFAs, HSAs, HRAs, FSAs, IRAs, etc.), bank accounts, credit cards, benefit plans, auto-deposit configurations, withdrawal mechanisms, etc. The management system may further manage the investments within the TAAs and provide other suitable services. A management system may provide an individual identification card or a debit card to provide information about the various accounts included in the management system.

The management system may additionally provide accelerated access to funds within a TAA, such as an HSA, through a corresponding contribution funded on-demand account. By enabling an employee accelerated access to future contributions stored within the on-demand account, an employee may more likely be able to pay for larger qualified expenses starting from the first day of the plan year. Greater detail for providing an on-demand based account is provided in reference to U.S. Non-Provisional application Ser. No. 15/651,645, which is incorporated by reference herein in its entirety.

An account holder may link a TAA with a payment card, e.g. a debit card, or any electronic or other funding mechanism enabling the individual to access funds within the TAA to pay for qualified expenses. The individual may further establish a hierarchical payment methodology in a management system, by providing multiple accounts with associated priorities to pay for qualified expenses. Greater detail for providing flexible and prioritized multi-purse tables is provided in reference to U.S. Non-Provisional application Ser. No. 15/282,244, which is hereby incorporated by reference herein in its entirety.

A management system may automatically adjudicate real-time card transactions in a TAA, for example a CFA. Greater detail for auto-adjudicating real-time card transactions using delayed transaction records is provided in reference to U.S. Non-Provisional application Ser. No. 15/239,691, which is hereby incorporated by reference herein in its entirety.

An account holder may take a distribution from a TAA at any time, but only the amount used to pay for a qualified expense may realize any tax advantages. In order to claim a qualified expense as a deduction, the TAA may need to exist before the account holder incurs the qualified expense and/or pays for the expense. An individual at the point of sale/service of a qualified expense may or may not have previously created a TAA and thus not be positioned to create and take advantage of a tax deduction. Furthermore, an individual may be unaware of the tax advantages provided by TAAs. Thus, a need exists for tools to expedite the creation and funding of TAAs at a point of sale/service so that a prospective account holder may use funds from a TAA to pay for a qualified expense, and keep appropriate records thereof. Currently existing point of sale/service systems do not have the infrastructure needed to execute such creation and funding.

According to an embodiment of the present invention, a management system may, at the point of sale/service, verify a prospective account holder's identity to create a TAA. After facilitating creation of the new TAA, the management system may fund the TAA via a banking transaction using a selected or previously configured payment method, e.g., credit card, debit account, cash, online account, etc. Then, by generating a banking transaction to transfer payment to the provider from the newly created TAA, the management system facilitates payment from the TAA for a qualified expense.

FIG. 1 illustrates a system 100 involved in creating and funding a TAA at a point of sale/service to pay for a qualifying expense, according to an example embodiment. System 100 includes management system 102, bank system 106, provider system 108, and point-of-sale/service terminal 110, connected via network 104. Each of the systems or components may be implemented using one or more processors. Although the systems are depicted as remote systems connected via network 104, one or more systems may be operated by or maintained by one entity. For example, provider system 108 and point-of-sale/service terminal 110 may be part of a single system operated by one entity.

Management system 102 may manage TAAs and facilitate TAA creation, maintenance, and support. A benefit plan within management system 102 may comprise multiple TAAs, bank accounts, credit cards, benefit plans, auto-deposits, withdrawal mechanisms, user-identifying information, employment information, ancillary management tools, etc. Management system 102 may further provide tools to manage investments comprising the TAAs. Management system 102 may also facilitate on-demand accounts, multi-purse technologies, and real-time auto-adjudication of claims. Management system 102 may determine whether expenses qualify as qualified expenses. Management system 102 may coordinate new account creation for account holders and prospective account holders. Management system 102 may create and fund a new TAA at a point of sale/service and render payment to a provider therefrom.

Network 104 may enable management system 102 to communicate with bank system 106, provider system 108, and point-of-sale/service terminal 110. Network 104 may be an enterprise wide area network (WAN) utilizing Ethernet communications, a LAN, the Internet, or other public or private network, although other wired and/or wireless communication techniques, protocols, and technologies may be used.

Bank system 106 may be utilized by a bank or other qualified nonbank institution(s) to store information about account holders and their bank accounts. Bank system 106 may further accept deposits, facilitate withdrawals, render payment for purchases, etc. Bank system 106 may communicate with multiple systems 100 in order to create and fund a new TAA at a point of sale/service and render payment to the provider therefrom. In an embodiment, bank system 106 may be managed by a bank or other qualified nonbank institution(s), and receive and send web service requests via network 104 in order to facilitate the transferring of funds and the creation of accounts.

Provider system 108 may be utilized by a provider to manage account information, generate bills, receive payments, etc. at locations where qualified services and expenses are offered. For example, a provider of qualified medical services may be physicians, surgeons, dentists, and other suitable medical practitioners. Provider system 108 may track information about customers, patients, or individuals. Provider system 108 may generate bills for any services provided or associated expenses accrued and initiate banking transactions to receive payment for services rendered from TAAs, credit card accounts, debit accounts, etc. Provider system 108 may accept cash payment for services rendered. Provider system 108 may interact with management system 102 to create and fund TAAs as described in further detail below.

Point-of-sale/service terminal 110 may be a credit card swiping machine, laptop computer, desktop computer, mobile device, or other suitable computing device that interacts with multiple systems 100, including management system 102, network 104, bank system 106, and provider 108, at the point of sale/service in order to facilitate the creation and funding of a TAA and, subsequently, to receive payment from the newly created TAA. Point-of-sale/service terminal 110 may view information stored on any of the depicted systems in the form of HTML pages or other suitable web transmissions. In an alternate embodiment, point-of-sale/service terminal 110 may be communicatively coupled or contained in the same physical machine as provider system 108.

Figure 2:
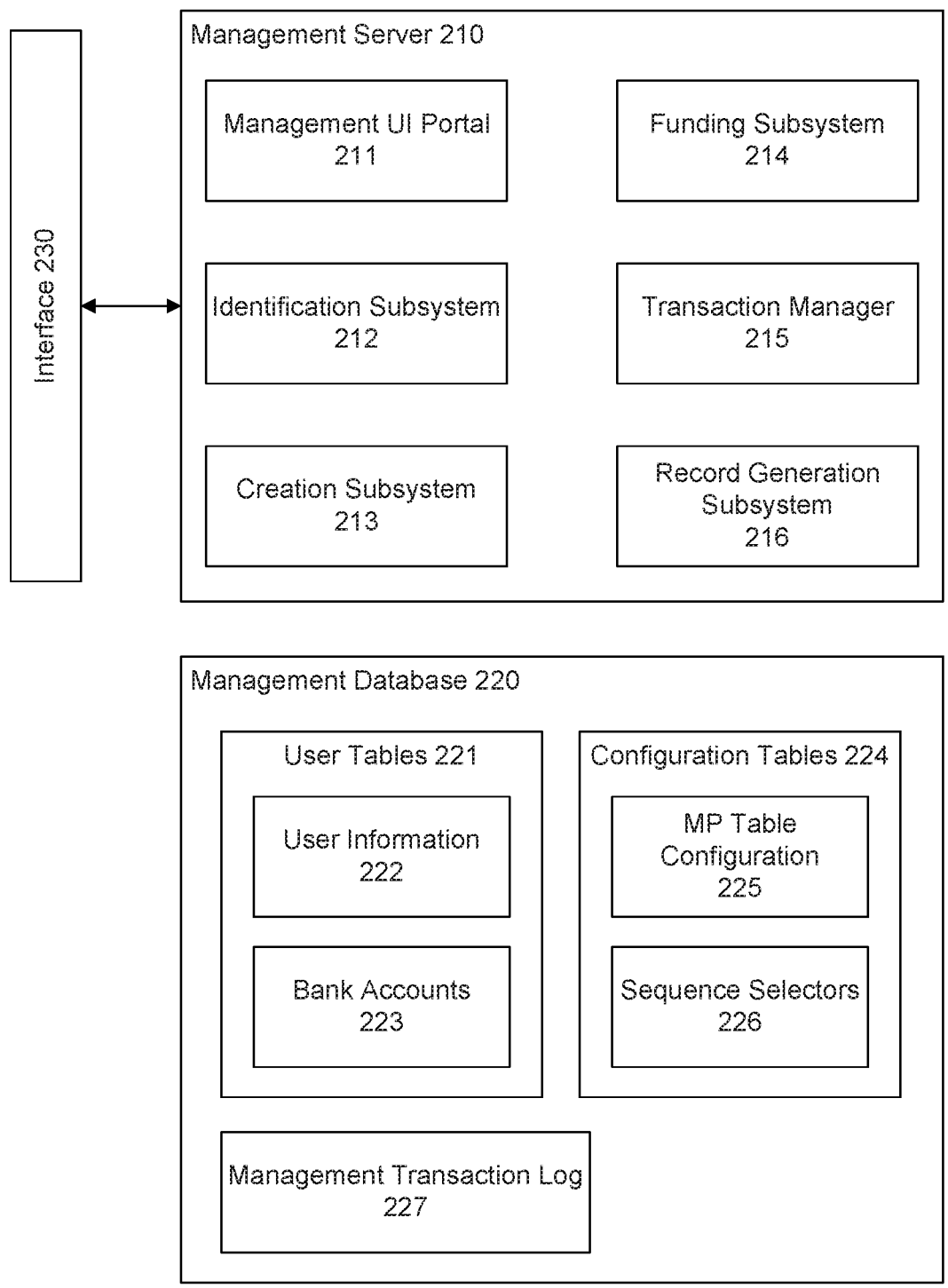
FIG. 2 is an example block diagram illustrating components within a management system allowing the creation and funding of a TAA at a point of sale/service to pay for a qualifying expense, according to an example embodiment.

FIG. 2 illustrates management system 200 that creates, maintains, configures, and manages TAAs, bank accounts, benefit plans, etc. of individuals, organizations, or other suitable entities, according to an exemplary embodiment of management system 102. Management system 200 may include management server 210, management database 220, and interface 230. Though depicted as a single server, management server 210 may in some embodiments be representative of a plurality of servers, each of which may be implemented by one or more processors. Likewise, management database 220 may be representative of a plurality of databases coupled to a plurality of management servers. Management database 220 may be implemented on one or more storage devices.

Management server 210 may include management UI portal 211, identification subsystem 212, auto-creation subsystem 213, funding subsystem 214, transaction manager 215, and record generation subsystem 216. One or more of the depicted components may be implemented as processing systems comprising one or more sub-components. These sub-components may include an interface for communicating within and/or across systems and a distribution component for sending information to other components and/or across systems.

Management UI portal 211 may accommodate transmissions from point-of-sale/service terminal 110 in order to create and fund a new TAA for a prospective account holder. Management UI portal 211 may further allow an individual or a plan manager acting on behalf of the individual to adjust and maintain an individual's accounts, benefit plan offerings, and information related to an individual's selected benefit plan. Management UI portal 211 may allow the individual to view TAA details or benefit plan details including statuses, balances, and transactions. Management UI portal 211 may verify the identity of the individual or plan manager using an encrypted login/password combination or appropriate identification methodology. Management UI portal 211 may be further configured to allow an individual to generate records of qualified expenses for the purposes of tax-advantage recordkeeping. Adjustments made within management UI portal 211 may propagate to bank system 106 and/or provider system 108. Management UI portal 211 may provide analytics and report generation capabilities.

Identification subsystem 212 may verify the identity of a prospective account holder opening a TAA at a point of sale/service. Identification subsystem 212 may receive an identity verification request from provider system 108 or point-of-sale/service terminal 110. Identification subsystem 212 may simultaneously or subsequently receive uniquely identifying information from provider system 108 or point-of-sale/service terminal 110 including a full name, social security number, or other suitable information about the prospective account holder. In one embodiment, identification subsystem 212 may send a web transmission, e.g., a web service request, to a qualified identity verification agent and receive in response an identity verification. In an alternate embodiment, a representative of the provider at the point of sale/service may verify the identity of the prospective account holder by checking a driver's license or other suitable identification. In this embodiment, identification subsystem 212 may receive with the verification request a confirmation that the prospective account holder provided necessary documentation.

Creation subsystem 213 may create requisite account information for the prospective account holder in management database 220, and facilitate account creation in system 100. Creation subsystem 213 may utilize identifying information, e.g., full name, social security number, etc., to uniquely identify the prospective account holder. Creation subsystem 213 may also create an identification number specific to management system 102 and utilize the unique identifier throughout tables in management database 220 to identify the prospective account holder. Creation subsystem 213 may receive additional information about the prospective account holder including: credit card accounts, debit accounts, other funding sources, etc., for prioritizing into a hierarchical account structure at the time of account creation. Further details about the role of creation subsystem 213 in creating a TAA is described below in reference to FIGS. 5-6.

Funding subsystem 214 may receive from point-of-sale/service terminal 110 or provider system 108 a monetary amount with which to fund a newly created TAA. The amount may be greater than the cost of the qualified expense, it may be equal to the cost of the qualified expense, or it may be less than the qualified expense. Funding subsystem 214 may further receive a designated account from which to fund the newly created account. Funding subsystem 214 may receive this information through a web service request or via interface 230, i.e. via a web-interface and one or more servers processing web-based traffic and HTTP request methods. Further details about the role of funding subsystem 214 in funding a TAA is described below in reference to FIGS. 5-6.

Transaction manager 215 may manage transactions received from any of the systems in FIG. 1. Transaction manager 215 may be further configured to generate associated bank transactions to facilitate the creation of new TAAs, the funding of the TAAs, and rendering payment to a provider of a qualified expense. Transaction manager 215 may store both the received transactions and generated transactions in management transaction log 227. As part of creating and funding accounts across the multiple systems of FIG. 1, transaction manager 215 may send a generated bank transaction to transaction manager 312 in bank system 106 or to transaction manager 412 in provider system 108.

Record generation subsystem 216 may generate records of transactions, account creations, and payments of qualified expenses. Record generation subsystem 216 may create PDFs, DOCs, HTML documents, or other documents for downloading and viewing. Record generation subsystem may pull requisite information from management database 220 using, for example, appropriately formatted SQL queries and subsequently utilize a typesetting program, PDF or document generation module, other suitable method to generate the document.

Management database 220 may store information about account holders via one or more of the following database tables: user tables 221, configuration tables 224, and management transaction log 227. User tables may include user information 222 and bank accounts 223. Configuration tables 224 may include MP table configurations 225 and sequence selectors 226. Management database 220 may store records and information related to management system 200 in any commercially available database management system or open-source solution such as Microsoft Access, Microsoft SQL server, an Oracle database, an IBM database, etc. Management database 220 may maintain communicative connections via traditional networking infrastructure such as routers, switches, hubs, firewalls, etc.

User tables 221 may store account holders' information including benefit plan, account information, account balances, account settings and customizations, user demographic information, transaction history, etc. User tables 221 may include user information 222 and bank accounts 223.

User information 222 may include user-identifying information, such as and without limitation: full name, date of birth, address, phone number, email address, other contact information, social security number, and other suitable demographic information. User information 222 may also include census information, salary, employment status, associated employer, contribution amounts, and other suitable user information. User information 222 may further include investment information describing the proportion of funds within TAAs or other bank accounts that are currently allocated for investing. User information 222 may further include encrypted login/password combinations or other security-related information.

Bank accounts 223 may store information about bank accounts for account holders represented in user information 222. Point-of-sale/service terminal 110 may transmit the bank account information to management system 102 for storage in bank accounts 223 when initially creating accounts for the prospective account holder. Bank accounts 223 may include account numbers, routing numbers, user names, financial institution information, and other account identifiers.

Configuration tables 224 may store configuration and setting information for account holders. Configuration tables 224 may store information relevant to a hierarchical-payment-account configuration that management system 102 receives when creating the TAA at the point of sale/service. Configuration tables 224 may include MP table configurations 225 and sequence selections 226.

MP table configuration 225 may include MP-table configurations selected or configured that specify a hierarchical-payment-account configuration. An MP-table configuration may be a template for a data structure representing the TAAs, bank accounts, credit accounts, etc., selected for a benefit plan, and may represent various rules and restrictions associated with the accounts.

Sequence selections 226 may store claims processing sequences for the account holder. A processing sequence may include a prioritized list of account identifiers, each account ID associated with a corresponding TAA, bank account, credit card, etc. The processing sequence may include a prioritized list of all possible account identifiers corresponding to all possible accounts provided within bank accounts 223.

Management transaction log 227 may store records of generated and received transactions. Transaction records may include records of banking transactions, account creations, and other activities of management system 200. As part of creating TAAs and generating transactions for the TAAs across the multiple systems of FIG. 1, management transaction log 227 may store generated bank transactions to/from transaction manager 304 in bank system 106 and to/from transaction manager 412 in provider system 400.

Interface 230 may enable management system 200, through, for example, management server 210, to communicate with one or more systems 100 depicted in FIG. 1. Though depicted as a separate component, interface 230 may be implemented within management server 210, according to an exemplary embodiment. Interface 230 may allow system 100 to update, modify, and otherwise configure the information in management system 200. Interface 230 may provide a web-interface to achieve this functionality, i.e., one or more servers processing web-based traffic and HTTP request methods. Interface 230 may process web-traffic, HTTP request methods, web service requests (e.g., XML, SOAP, USDL, or UDDI) from system 100. Interface 230 may accept a username token, security token, public key, etc. to establish a trusted connection or utilize another method of determining the identity of the requester. A standard web server technology may be deployed, for instance Microsoft IIS or Apache, to listen for, process, and respond to any of these incoming hits/requests. Interface 230 may return pages via HTTP, which interface 230 formulates in accordance with hypertext transfer protocol W3C standards. The returned pages may also include images, stylesheets, and scripts, the content and nature of which will be appreciated by those skilled in the relevant art(s). Interface 230 may specifically format the responses for viewing on a mobile device in adherence with W3C mobile web best practices. In some embodiments, management system 200 may respond to web service requests received from one system in system 100 and subsequently send a web service request to another system in system 100.

Figure 3:
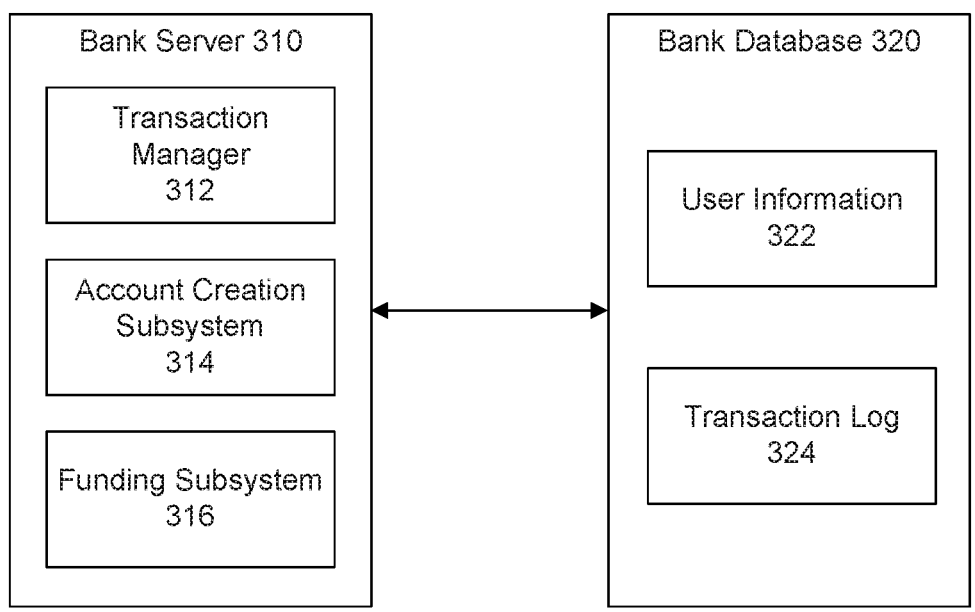
FIG. 3 is an example block diagram illustrating components within a bank system allowing the creation and funding of a TAA at a point of sale/service to pay for a qualifying expense, according to an example embodiment.

FIG. 3 is an example block diagram illustrating components within bank system 300 allowing the creation and funding of a TAA at a point of sale/service, according to an example embodiment. Bank system 300 may include bank server 310 and bank database 320. Though depicted as a single server, bank server 310 may be representative of a plurality of servers, each of which may be implemented by one or more processors. Likewise, bank database 320 may be representative of a plurality of databases coupled to a plurality of bank servers. Additionally, one or more of the depicted components may be implemented as processing systems comprising one or more sub-components. These sub-components may include an interface for communicating within and/or across systems and a distribution component for sending information to other components and/or across systems.

Bank server 310 may be configured to include transaction manager 312, account creation subsystem 314, and funding subsystem 316. Bank server 310 may provide a web-interface to achieve this functionality, such as one or more servers processing web-based traffic and HTTP request methods. Bank server 310 may process web-traffic, HTTP request methods, web service requests (e.g., XML, SOAP, USDL, or UDDI) from system 100. A standard web server technology may be deployed, for instance Microsoft IIS or Apache, to listen for, process, and respond to any of these incoming hits/requests. In some embodiments, bank server 310 may respond to web service requests received from one system in system 100 and subsequently send a web service request to another system in system 100.

Transaction manager 312 may process transactions received from one or more of the systems or computers depicted in FIG. 1 as would be understood by one skilled in the art(s). Transaction manager 312 may receive transactions generated by transaction manager 215 in management system 200 for account creation and funding and rendering of payment for a qualified expense as described in FIG. 2 and further described in FIGS. 6-7. Transaction manager 312 may also receive transactions generated by transaction manager 412 in provider system 400 for account creation and funding and rendering of payment for a qualified expense as described in FIG. 4 and further described in FIGS. 6-7.

Account creation subsystem 314 may be configured to communicate with creation subsystem 213 in management system 200 in order to create new account information in bank database 320, and to fund that account via transaction manager 312. For example, account creation subsystem 314 may receive a request from point-of-sale/service terminal 110 to open and fund a TAA and to cover the cost of a qualified expense from the newly created TAA. Accordingly, account creation subsystem 314 may update records stored in bank database 320 to reflect the newly created account. Account creation subsystem may add or insert records into user information 322.

Funding subsystem 316 may receive funds related to provided qualified expenses. Funding subsystem 316 may include information regarding bank accounts, debit accounts, credit accounts, and other fund receiving mechanisms. Funding subsystem 316 may provide account numbers, routing numbers, and/or other payment device information upon request in order to facilitate payment and receive funds.

Bank database 320 may store user information 322 and transaction log 324 in one or more database tables. Bank database 320 may store records and information related to bank system 300 in any commercially available database management system such as Microsoft Access, Microsoft SQL server, an Oracle database, an IBM database, etc. Bank database 320 may maintain communicative connections via traditional networking infrastructure such as routers, switches, hubs, firewalls, etc.

User information 322 may store identifying personal information for account holders or prospective account holders. User information 322 may include identifying information, such as and without limitation full name, date of birth, address, phone number, email address, other contact information, social security number, and other suitable demographic information. User information 322 may further store encrypted login/password information used to verify the users' identities.

Transaction log 324 may store and maintain transaction logs. Such transactions may be received, for example, by bank transaction manager 312 from transaction manager 215 within management system 200 or generated within bank system 300. Transaction log 324 may store sufficient documentation to support and validate the transaction.

Figure 4:
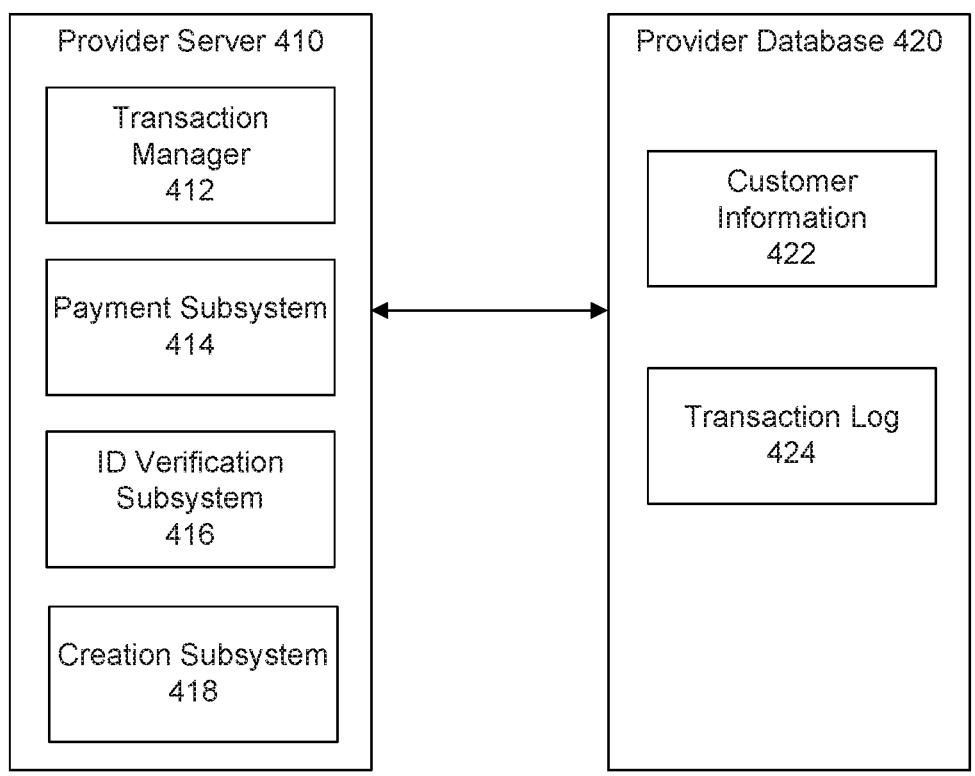
FIG. 4 is an example block diagram illustrating components within a provider system allowing the creation and funding of a TAA at a point of sale/service to pay for a qualifying expense, according to an example embodiment.

FIG. 4 is an example block diagram illustrating components within provider system 400 allowing the creation and funding of a TAA at a point of sale/service, according to an example embodiment. Provider system 400 may include provider server 410 and provider database 420. Though depicted as a single server, provider server 410 may be representative of a plurality of servers, each of which may be implemented by one or more processors. Likewise, provider database 420 may be representative of a plurality of databases coupled to a plurality of provider servers. Additionally, one or more of the depicted components may be implemented as processing systems comprising one or more sub-components. These sub-components may include an interface for communicating within and/or across systems and a distribution component for sending information to other components and/or across systems.

Provider server 410 includes transaction manager 412, payment subsystem 414, identity verification subsystem 416, and creation subsystem 418. Provider server 410 may provide a web-interface to achieve this functionality, i.e., one or more servers processing web-based traffic and HTTP request methods. Provider server 410 may process web-traffic, HTTP request methods, or web service requests (e.g., XML, SOAP, USDL, or UDDI) from across system 100. A standard web server technology may be deployed, for instance Microsoft IIS or Apache, to listen for, process, and respond to any of these incoming hits/requests. Provider server 410 and point-of-sale/service terminal 110 may reside on a single server or be representative of a plurality of servers that connect through a suitable network connection.

Transaction manager 412 may process transactions received from one or more of the systems or computers depicted in FIG. 1, as would be understood by one skilled in the art. Transaction manager 412 may be configured to generate and send banking transactions to transaction manager 215 of management system 200, transaction manager 312 of bank system 300, or to a qualified electronic transaction clearing house to fund a TAA and receive payment of a qualified expense therefrom.

Payment subsystem 414 may send billing information to transaction manager 215 of management system 200. Payment subsystem 414 may receive appropriate funding to cover a qualified expense from funding subsystem 316 of bank system 300. Payment subsystem 414 may include an account number and/or routing number for receiving payments to cover services provided.

Identity verification subsystem 416 may send an identity verification request to management system 102. Identity verification subsystem 416 may require an onsite representative to verify a qualified issued identification source. Identity verification subsystem 416 may send a web service request to a qualified identity verification agent and receive in return an identity verification response. Identification verification subsystem 416 may communicate via network transmissions with identification subsystem 212 of management system 200 described in FIG. 2.

Provider database 420 includes customer information 422 and transaction log 424. Provider database 420 may be configured to store customer information 422 and transaction log 424 via one or more database tables. Provider database 420 may store records and information related to provider system 400 in any commercially available database management system such as Microsoft Access, Microsoft SQL server, an Oracle database, an IBM database, etc. Provider database 420 may maintain communicative connections via traditional networking infrastructure such as routers, switches, hubs, firewalls, etc.

Customer information 422 may include identifying personal information related to the customer's association with and purchases from the provider. Customer information 422 may include identifying personal information for customers, such as and without limitation, full name, date of birth, address, phone number, email address, other contact information, social security number, and other suitable demographic information. Customer information 422 may further include preferences, settings, internal identification numbers, appointment information, medical history, or any other suitable information pertinent to provider system 400.

Transaction log 424 may store and maintain records of banking transactions, account creations, and other occurrences in provider system 400. These transactions may be received, for example, from transaction manager 215 within management system 200, generated within bank transaction manager 312, or generated within transaction manager 412.

Figure 5:
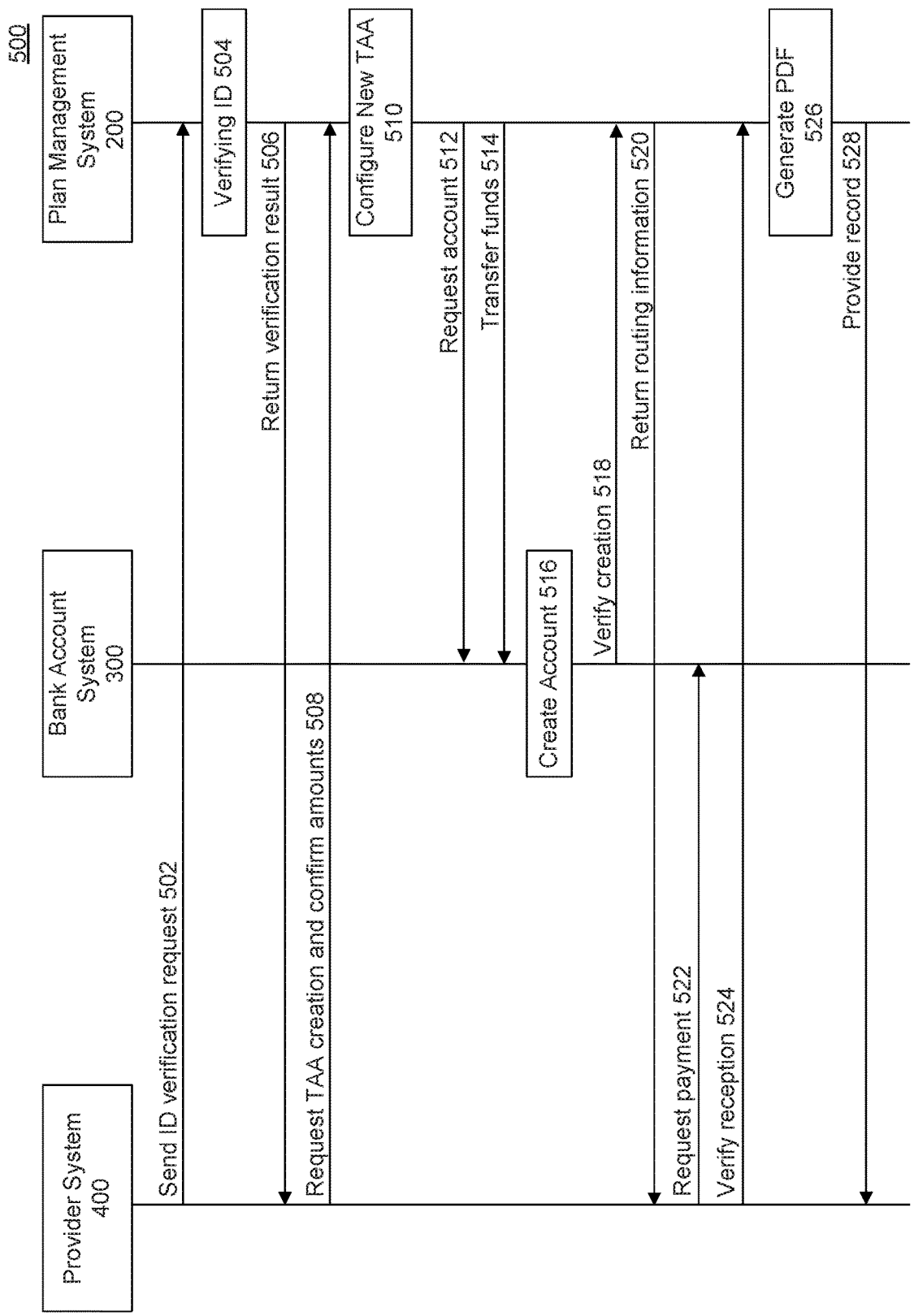
FIG. 5 is a flowchart illustrating steps for creating and funding a TAA and subsequently rendering payment of a qualified expense, according to an example embodiment.

FIG. 5 illustrates a method 500 of creating and funding a TAA in order to provide payment for a qualified expense at a point of sale/service, according to some embodiments. Method 500 may initiate at the point of sale/service of a qualified expense when the recipient elects to create and fund a TAA at the point of sale/service. Subsequently, the TAA transfers payment to the provider of the qualified expense facilitating payment from the TAA to the recipient for the qualified expense. Method 500 may be performed by processing logic that may include hardware (e.g., circuitry, dedicated logic, programmable logic, microcode, etc.), software (e.g., instructions run on a processing device), or a combination thereof. In an embodiment, some steps in FIG. 5 may not need to be performed in the exact order shown as one skilled in the art would understand.

In step 502, identity verification subsystem 416 of provider system 400 may send an identification verification request to management system 200 regarding a prospective account holder. Identity verification subsystem 416 may receive the entry of requisite data in forms generated and provided via HTTP, formulated in accordance with hypertext transfer protocol W3C standards. In an alternate embodiment, identification subsystem 212 of management system 200 or interface 230 serves appropriate forms and webpages to facilitate data entry from provider system 400. Management system 200 may specifically format the responses for viewing on a mobile device in adherence with W3C mobile web best practices so that the available rewards may be viewed via communication interfaces. In an alternate embodiment, interface 230 may process web service requests (e.g., XML, SOAP, USDL, or UDDI) from provider system 400.

In step 504, identification subsystem 212 of management system 200 may receive the identification request and verify the identity of the prospective account holder. The user-identifying information may include, for example and without limitation, a full name, date of birth, social security or other identifying number, and/or other suitable information. Identification subsystem 212 may receive this data as text, JSON, XML, HTML, or other human readable format or appropriate machine readable format. Identification subsystem 212 may further require an on-site identity check through manual or electronic validation and confirmation of a state identification card, social security card, passport, or other qualifying method of manual identification verification. In such an embodiment, management system 200 may receive a further transmission from provider system 400 confirming that manual validation of identification occurred. Identification subsystem 212 may send an appropriately formatted web service request or other suitable transmission to an independent identification verification organization in order to verify an individual's identity to create a TAA. In response, identification subsystem 212 may receive an appropriately formatted response, e.g. XML or other suitable format, indicating the success or failure of the independent identification verification. In alternate embodiments, plan management system 200 may contact an independent identification verification organization through other suitable communication methods, or management system 200 may perform the verification of the prospective account holder internally within identification subsystem 212.

In step 506, identification subsystem 212 of management system 200 may return a verification result to provider system 400, depending on the outcome of step 504. The verification may be a successful verification of the identity of the prospective account holder to start and fund a TAA, an inability to verify identity, a failed or unsuccessful transmission/response, etc. Identification subsystem 212 may provide the verification result via appropriate HTML web pages, i.e. in forms and pages generated and provided via HTTP or other suitable protocol, or identification subsystem 212 may return the results via web service request or other suitable transmission.

In step 508, creation subsystem 418 of provider system 400 may receive the verification of a successful validation of the prospective account holder and request the creation of the new TAA. Creation subsystem 418 may provide further information about the account(s) to create and the prospective account holder to management system 200. This information may include, for example and without limitation: bank or credit card account information for the prospective account holder, MP configuration information, the cost of the qualified expense, the total amount of funds with which to fund the new TAA (which may be greater than, equal to, or less than the cost of the qualified expense), and other suitable information about the prospective account holder, the new TAA, and/or the qualified expense. Similar to step 502, creation subsystem 418 may submit the information via HTTP or other suitable protocol, utilizing web service requests, or other suitable approach.

In step 510, creation subsystem 213 of management system 200 may create and configure a new TAA for the prospective account holder. Creation subsystem 213 may create and/or insert new records into user tables 221 to add records of the prospective account holder to management system 200. Creation subsystem 213 may further update existing records if the prospective account holder already exists in some alternate capacity in user tables 221, e.g., if management system 200 tracks the prospective account holder's retirement accounts IRA but not the type of TAA being created. In addition to updating/inserting information into user information 222, creation subsystem 213 may add records corresponding to the received bank accounts from provider system 400 to bank accounts 223. Creation subsystem 213 may further update configuration tables 224 when the prospective account holder simultaneously configures a hierarchy of payment accounts in management system 200. Creation subsystem 213 may also add records to MP table configuration 225 and sequence selectors 226. Creation subsystem 213 may record the creation of the accounts as a transaction in management transaction log 227.

In step 512, creation subsystem 213 of management system 200 requests the creation of one or more accounts with account creation subsystem 314 of bank system 300. Creation subsystem 213 may transmit requisite information to account creation subsystem 314 to open the TAA. The information may include, for example and without limitation: account type(s), first name, middle name, last name, email address, phone numbers, social security number, name of employer, address, identity verification garnered in step 504, and/or any other suitable or required information.

In step 514, funding subsystem 214 of management system 200 generates an appropriate transaction or transactions to transfer the requisite amount of funds to funding subsystem 316 of bank system 300. Funding subsystem 214 may utilize the bank or credit card account information for the prospective account holder received in step 508 as the source account of the formulated banking transaction. Funding subsystem 214 may utilize the amount requested in step 508 as the transfer amount. Funding subsystem 316 of bank system 300 may verify a successful funding of the TAA to management system 200.

In step 516, account creation subsystem 314 of bank system 300 creates an account to serve as the TAA. Account creation subsystem 314 may provide a web interface to receive web transmissions allowing the automatic creation of the TAA. Account creation subsystem 314 may perform additional identity verification services. Account creation subsystem 314 may receive this data as text, JSON, XML, HTML, or other human readable format or appropriate machine readable format. Account creation subsystem 314 may formulate appropriate queries and receive results by running these queries on bank database 320. Account creation subsystem 314 may assign an American Bankers Association (ABA)/routing number, transit number, and/or account number for use in banking transactions such as electronic fund transfers, deposits, bill payments, tax payments, etc. Account creation subsystem 314 may utilize the transferred funds from 514 to initially fund the created account.

In step 518, account creation subsystem 314 of bank system 300 returns verification of the account creation to funding subsystem 214 of management system 200, depending on the occurrences in step 514. Account creation subsystem 314 may transmit this data as text, JSON, XML, HTML, or other human readable format or appropriate machine-readable format to funding subsystem 200. The verification may indicate a successful creation of the account or denote an unsuccessful account creation. The verification may further include the ABA number, transit number, and/or account number for the newly created TAA, which plan management system 200 may subsequently utilize.

In step 520, creation subsystem 213 of management system 200 returns a verification to provider system 400. Such a verification may indicate a successful creation of the TAA and a further confirmation that the TAA received the initial amount of funds in the TAA as requested in step 508. The verification may include an account number and an ABA number or other routing number reflecting the newly created, funded TAA as received in step 516.

In step 522, payment subsystem 414 of provider system 400 may request payment of the qualified expense from transaction manager 312 of bank system 300. In an alternate embodiment, step 522 may be performed by transaction manager 215 of plan management system 200. Payment subsystem 414 (or in an alternate embodiment, transaction manager 215) may generate an appropriate banking transaction for processing by an automatic clearing house. The source account may be the newly created TAA reflected in the routing number and account number received in step 516 and transmitted to provider system 400 in step 520. The destination account may be a bank account and/or routing number or an alternate provider payment method determined by payment subsystem 414.

One skilled in the art(s) will appreciate that the amount of the qualified expense may be less than the initial funding amount determined by the account holder in step 508. In this case, the TAA may retain a balance after step 520 completes. Similarly, the qualified expense may be greater than the initial funding amount (perhaps because the qualified expense is greater than the allowable initial contribution amount of the TAA). In this case, provider system 400 may seek a remaining balance from the account holder via an alternative payment method.

In step 524, creation subsystem 418 of provider system 400 may verify the fund transfer from the newly created TAA to provider subsystem 414. Similar to step 502, creation subsystem 418 may submit the information via HTTP, HTTPS, utilizing web service requests, or using another suitable approach. The information may include information relevant to the transaction and a record generation request flag.

In step 526, record generation subsystem 216 of management system 200 may generate an appropriate record of the transaction. Record generation subsystem 216 may generate a record of the transaction and store it in management transaction log 227. In addition to generating a record of the transaction and storing the record in management database 220, record generation subsystem 216 may create a PDF, image file, or other suitable MIME type file and store the file, for example on a NAS, SAN, local hard drive, or other suitable storage mechanism, to serve later via HTTP or other suitable protocol.

In step 528, management UI portal of management system 200 may make available to provider system 400 the recordkeeping document generated in 526. Such a document may be served to the account holder or a representative at provider system 400 via management UI portal 211. Record generation is discussed in further detail below with reference to FIG. 7.

Figure 6:
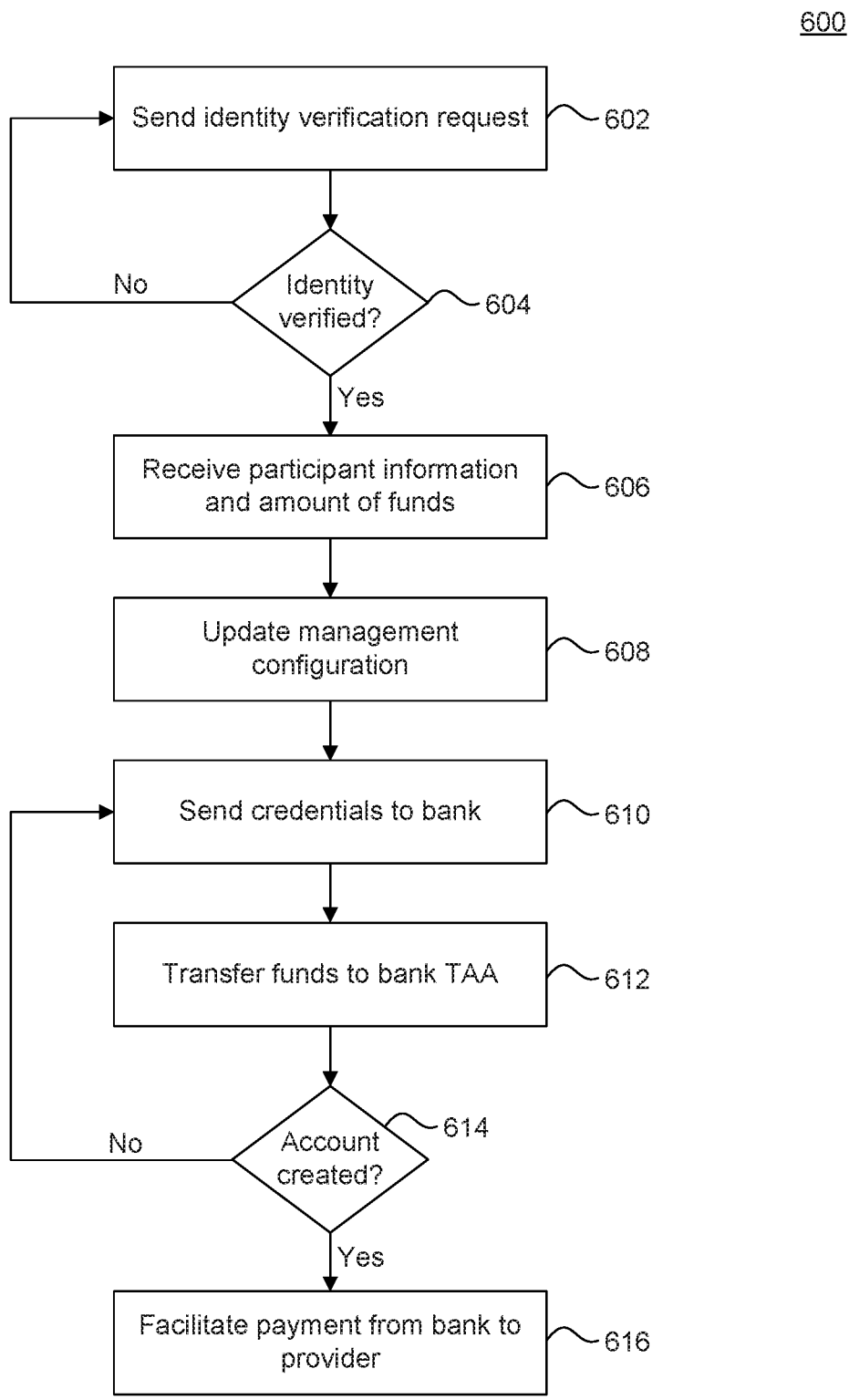
FIG. 6 is a flowchart illustrating steps for creating and funding a TAA and subsequently rendering payment of a qualified expense, according to an example embodiment.

FIG. 6 illustrates a method 600 of creating and funding a TAA in order to provide payment for a qualified expense at a point of sale from the perspective of management system 200, according to an example embodiment. Method 600 may be performed by processing logic that may include hardware (e.g., circuitry, dedicated logic, programmable logic, microcode, etc.), software (e.g., instructions run on a processing device), or a combination thereof. In an embodiment, some steps in FIG. 6 may not need to be performed in the exact order shown as one skilled in the art(s) would understand.

In step 602, identification subsystem 212 of management system 200 may send a verification request to a qualified identity verification agent. Identification subsystem 212 may transmit text, JSON, XML, HTML, or other human readable format or an appropriate machine readable format. Identification subsystem 212 may include, for example and without limitation, a full name, date of birth, social security or other identifying number, and any other suitable information. In response, identification subsystem 212 may receive an appropriately formatted response, e.g. XML or other suitable format, indicating the success or failure of the independent identification verification. In alternate embodiments, plan management system 200 may contact an independent identification verification organization via suitable communication methods, or management system 200 may perform the verification of the prospective account holder internally within identification subsystem 212. In another embodiment, identification subsystem 212 may receive confirmation of a prior conducted identity verification from identity verification subsystem 416 of provider system 400.

In step 604, identification subsystem of management system 200 determines if identification subsystem 212 verified the identity of the prospective account holder in step 602. If not, then method 600 returns to step 602. If identification subsystem 212 verified the prospective account holder's identity, then method 600 proceeds to step 606.

In step 606, creation subsystem 213 of management system 200 receives or retrieves additionally required information. Such information may include an amount of funds authorized by the prospective account holder with which to initially fund the TAA. Such information may further include demographic information about the prospective account holder, bank account, credit card account, or debit account information from which to initially fund the TAA, management plan configuration selections (e.g., a multi-purse configuration), and any other suitable information about the potential account holder or their accounts.

In step 608, creation subsystem 213 updates appropriate information in management database 220 based on the information received from provider system 108. Creation subsystem 213 may update user tables 221 by adding the prospective account holder's identifying information to user information 222. Creation subsystem 213 may further update bank accounts 223 to include savings, debit, credit, and other bank accounts received in step 606. Creation subsystem 213 may formulate and execute appropriate insert/update queries and execute these queries against management database 220.

In step 610, creation subsystem 213 of management system 200 sends the requisite credentials needed to create a new account for the prospective account holder to account creation subsystem 314 of bank system 300. The information may include account type(s), first name, middle name, last name, email address, phone numbers, social security number, name of employer, address, identity verification garnered in step 602, and any other suitable or required information. Creation subsystem 213 may receive in response a verification of a successful account creation. The verification may further include the ABA number, transit number, routing number, and/or account number for the TAA.

In step 612, funding subsystem 214 of management system 200 may generate one or more bank transactions and transmit them to funding subsystem 316 of bank system 300 to fund the new account with the amount of funding indicated in step 606. Funding system 213 may utilize an electronic fund transfer service or automatic clearing house to conduct the transaction. The source system and funding amounts may be designated by the prospective account holder.

In step 614, creation subsystem 213 of management system 200 determines if account creation subsystem 314 of bank system 300 successfully created an account. If creation subsystem 314 did not create an account, method 600 returns to step 610 and re-attempts to send the account creation credentials. If account creation subsystem 314 created an account, method 600 proceeds to step 616.

In step 616, transaction manager 215 of management server 200 may facilitate a payment from the newly created and funded TAA to payment subsystem 414 of provider system 400. For example, transaction manager may transmit to payment subsystem 414 the routing number and/or account number received in step 610 so that payment subsystem 414 of provider system 400 may generate an appropriate bank transaction in order to receive payment for the qualified expense. In an alternate embodiment, transaction manager 215 may generate and execute the transaction using the routing number and account number received in step 610 as the source system of the transaction.

Figure 7:
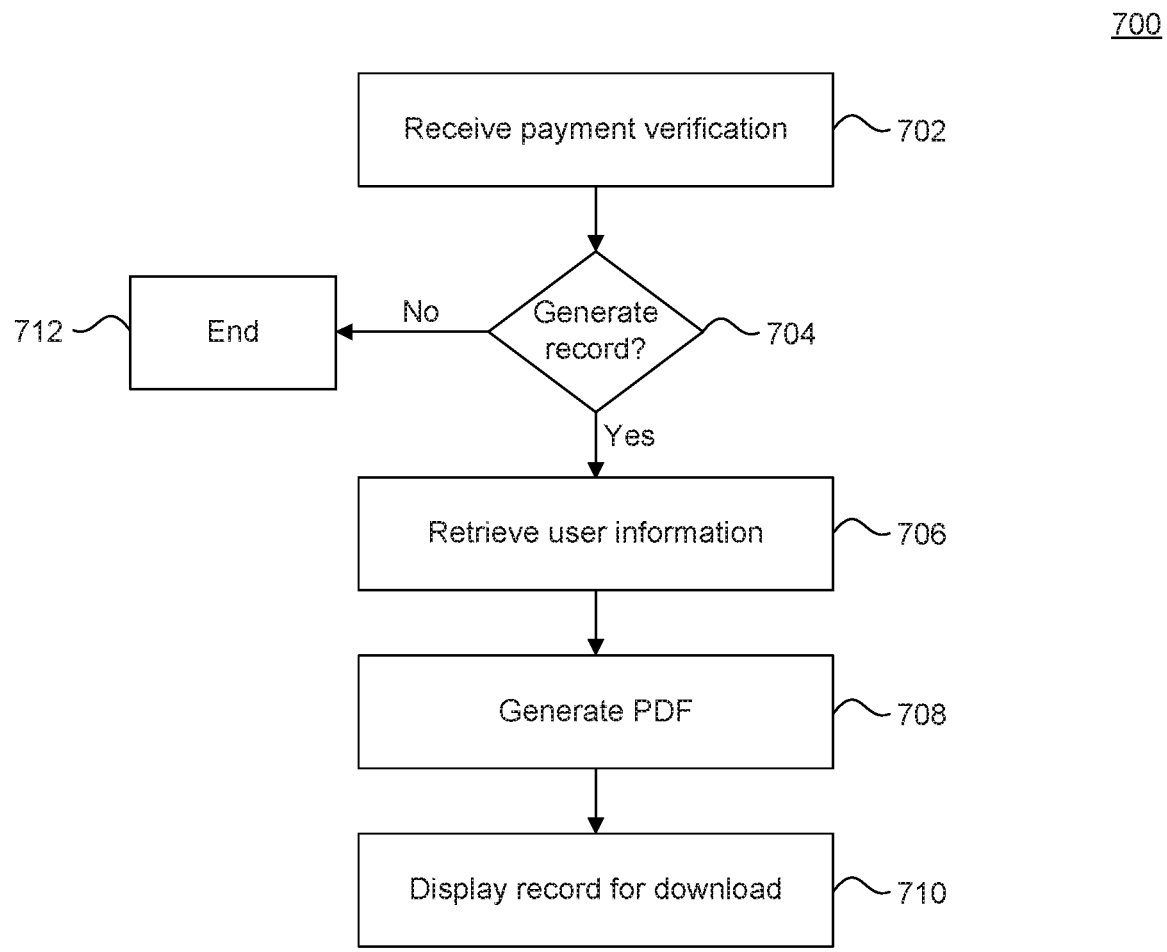
FIG. 7 is a flowchart illustrating steps for generating appropriate records for a payment of a qualified expense from a newly created TAA, according to an example embodiment.

FIG. 7 illustrates a method 700 of generating an appropriate record of a qualified expense paid for from a TAA, according to an example embodiment. Method 700 may be performed by processing logic that may include hardware (e.g., circuitry, dedicated logic, programmable logic, microcode, etc.), software (e.g., instructions run on a processing device), or a combination thereof. In an embodiment, some steps in FIG. 7 may not need to be performed in the exact order shown as one skilled in the arts would understand.

In step 702, record generation subsystem 216 receives a payment verification from payment subsystem 414 of provider system 400. The payment verification may include user-identifying information such as full name, social security number, internally generated user identifiers, etc. The verification may further include the service rendered or expenditures accrued, a line-by-line cost for each of the services rendered or expenditures accrued, and relevant bank accounts. The payment verification may further include a record request regarding the qualified expense to be used in step 704.

In step 704, record generation subsystem 216 of management system 200 determines if a user at point-of-sale/service terminal 110 requested the generation of an appropriately formatted record of the transaction. If not, then method 700 ends. If provider system 400 requested generation of record-keeping, then method 700 proceeds to 706.

In step 706, record generation subsystem 216 may retrieve account holder information needed to generate an appropriate record including the cost of qualified expense, the provider, a doctor name, an address at which the service was provided or received, a description of the service provided, identifying user information, and other suitable information. Record generation subsystem 216 may retrieve information from management database 220 including user tables 221, configuration tables 224, and management transaction log 227. In an alternate embodiment, the requisite information may have been received by record generation subsystem 216 in step 702.

In step 708, record generation subsystem 216 may generate an appropriate record. Record generation subsystem may create a PDF, DOC, HTML or other suitable file format for downloading. Record generation subsystem 216 may store the generated document in a SAN, NAS, local disk, other suitable locale. Record generation subsystem 216 may add records to management database 220 or management transaction log 227 to catalog the creation of the qualified expense paperwork.

In step 710, record generation subsystem 216 may return the generated document to provider system 400 for downloading and printing. Management UI portal 211 may provide an account holder or representative thereof access to retrieve or download the file via an appropriately formatted web page.

Figure 8:
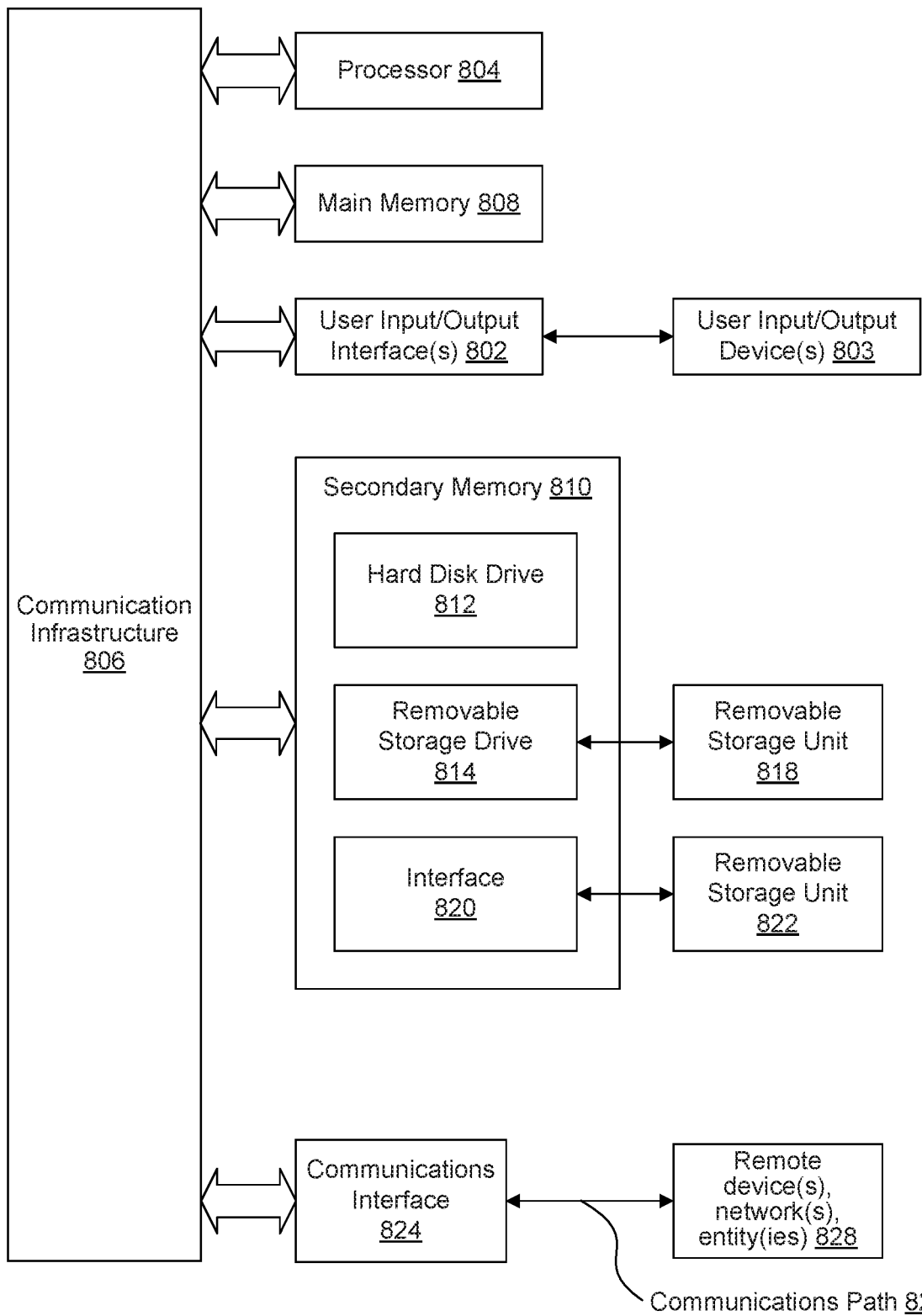
FIG. 8 is an example computer system useful for implementing various embodiments.

FIG. 8 is an example computer system that may be used to implement components of the systems illustrated in FIGS. 1-4, or which may be specially programmed to implement steps of the processes illustrated in FIGS. 5-7.

Various embodiments can be implemented, for example, using one or more well-known computer systems, such as computer system 800 shown in FIG. 8. Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/or any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
a management database;
a memory; and
at least one processor coupled to the memory and the management database and configured to:
receive a tax-advantaged account (TAA) creation request comprising a provider, a prospective account holder, demographic information associated with the prospective account holder, a cost of a qualified expenditure, an initial funding amount, and one or more bank accounts;
verify an identity of the prospective account holder by sending the demographic information in a web request to a qualified identity verification agent and receiving a confirmation response that confirms the identity of the prospective account holder;
generate a record comprising a balance in a user table in the management database associated with the prospective account holder and the one or more bank accounts and simultaneously generate and send a first transaction to a banking system requesting a creation of a TAA at the banking system;
receive a response from the banking system, in response to sending the first transaction, verifying a creation of the TAA,
in response to the response, generate a second transaction causing a transfer of a sum of funds equal to the initial funding amount from the one or more bank accounts to the TAA and a third transaction causing a transfer of the cost of the qualified expenditure to the provider account from the TAA; and
generate and store a record of the third transaction in the management database in association with the prospective account holder.

2. The system of claim 1, wherein the at least one processor is further configured to:
receive a multi-purse table configuration comprising account types and respective priorities, eligible service types, and access indicators for the one or more bank accounts;
store the multi-purse table configuration in the management database; and
store a per-service-type hierarchy among the one or more bank accounts based on the eligible service types, the access indicators, and the respective priorities.

3. The system of claim 2, wherein to transfer the sum of funds equal to the initial funding amount from the one or more bank accounts to the TAA, the at least one processor is further configured to:
select a first account from the one or more bank accounts, wherein the first account comprises a first balance;
determine that the first balance is less than the initial funding amount; and
select one or more additional bank accounts from the one or more bank accounts according to the per-service-type hierarchy to cumulatively service the initial amount.

4. The system of claim 1, wherein to transfer the cost of the qualified expenditure, the at least one processor is further configured to:
determine that the cost of the qualified expenditure is greater than the initial funding amount;
transfer a partial payment amount equal to the initial funding amount to the provider from the TAA;
determine a remaining amount equal to the partial payment amount subtracted from the cost of the qualified expenditure; and
send a notification of the remaining amount to the provider.

5. The system of claim 1, wherein the at least one processor is further configured to:
generate a qualified expenditure distribution reporting form based on the cost of the qualified expenditure.

6. The system of claim 1, wherein the one or more bank accounts comprise checking accounts, savings accounts, credit or debit card accounts, or other funding mechanisms.

7. A method, comprising:
receiving, by one or more processors, a tax-advantaged account (TAA) creation request from a provider comprising a prospective account holder, demographic information associated with the prospective account holder, a cost of a qualified expenditure, an initial funding amount, and one or more bank accounts;
verifying, by the one or more processors, an identity of the prospective account holder by sending the demographic information in a web request to a qualified identity verification agent and receiving a confirmation response that confirms the identity of the prospective account holder by the one or more processors, a record comprising a balance in a user table in a management database associated with the prospective account holder and the one or more bank accounts and simultaneously generating and sending a first transaction to a banking system requesting a creation of a TAA at the banking system;
receiving, by the one or more processors, a response from the banking system, in response to sending the first transaction, verifying a creation of the TAA;
in response to the receiving, generating, by the one or more processors, a second transaction causing a transfer of a sum of funds equal to the initial funding amount from the one or more bank accounts to the TAA and a third transaction causing a transfer of the cost of the qualified expenditure to the provider account from the TAA; and
generating and storing, by the one or more processors, a record of the third transaction in the management database in association with the prospective account holder.

8. The method of claim 7, further comprising:
receiving, by the one or more processors, a multi-purse table configuration comprising account types and respective priorities, eligible service types, and access indicators for the one or more bank accounts; and
storing, by the one or more processors, the multi-purse table configuration wherein the multi-purse table configuration establishes a per-service-type hierarchy among the one or more bank accounts based on the eligible service types, the access indicators, and the respective priorities.

9. The method of claim 8, wherein transferring the sum of funds equal to the initial funding amount from the one or more bank accounts to the TAA further comprises:
selecting, by the one or more processors, a first account from the one or more bank accounts based on the per-service-type hierarchy, wherein the first account comprises a first balance;
determining, by the one or more processors, that the first balance is less than the initial funding amount; and
selecting, by the one or more processors, one or more additional bank accounts from the one or more bank accounts according to the per-service-type hierarchy to cumulatively service the initial funding amount.

10. The method of claim 7, further comprising:
determining, by the one or more processors, that the cost of the qualified expenditure is greater than the initial funding amount;
transferring, by the one or more processors, a partial payment amount equal to the initial funding amount to the provider from the TAA;
determining, by the one or more processors, a remaining amount equal to the partial payment amount subtracted from the cost of the qualified expenditure; and
sending, by the one or more processors, a notification of the remaining amount to the provider.

11. The method of claim 7, further comprising:
generating, by the one or more processors, a qualified expenditure distribution reporting form based on the cost of the qualified expenditure.

12. The method of claim 7, wherein the one or more bank accounts comprise checking accounts, savings accounts, credit or debit card accounts, or other funding mechanisms.

13. A non-transitory computer-readable device having instructions stored thereon that, when executed by at least one computing device, causes the at least one computing device to perform operations comprising:
receiving, by a management system, a tax-advantaged account (TAA) creation request from a provider comprising a prospective account holder, demographic information associated with the prospective account holder, a cost of a qualified expenditure, an initial funding amount, and one or more bank accounts;
verifying an identity of the prospective account holder by sending the demographic information in a web request to a qualified identity verification agent and receiving a confirmation response that confirms the identity of the prospective account holder;
generating a record comprising a balance in a user table in a management database associated with the prospective account holder and the one or more bank accounts and simultaneously generating and sending a first transaction to a banking system requesting a creation of a TAA at the banking system;
receiving a response from the banking system, in response to sending the first transaction, verifying a creation of the TAA;
in response to the receiving, generating a second transaction causing a transfer of a sum of funds equal to the initial funding amount from the one or more bank accounts to the TAA and a third transaction causing a transfer of the cost of the qualified expenditure to the provider account from the TAA; and
generating and storing a record of the third transaction in the management database in association with the prospective account holder.

14. The non-transitory computer-readable device of claim 13, the operations further comprising:
receiving a multi-purse table configuration comprising account types and respective priorities, eligible service types, and access indicators for the one or more bank accounts; and
storing the multi-purse table configuration wherein the multi-purse table configuration establishes a per-service-type hierarchy among the one or more bank accounts based on the eligible service types, access indicators, and the respective priorities.

15. The non-transitory computer-readable device of claim 14, the operations further comprising:
selecting, by the management system, a first account from the one or more bank accounts, wherein the first account comprises a first balance;
determining, by the management system, that the first balance is less than the initial funding amount; and
selecting, by the management system, one or more additional bank accounts from the one or more bank accounts according to the per-service-type hierarchy to cumulatively service the initial funding amount.

16. The non-transitory computer-readable device of claim 13, the operations further comprising:
determining, by the management system, that the cost of the qualified expenditure is greater than the initial funding amount;
transferring a partial payment amount equal to the initial funding amount to the provider from the TAA;
determining a remaining amount equal to the partial payment amount subtracted from the cost of the qualified expenditure; and
sending a notification of the remaining amount to the provider.

17. The non-transitory computer-readable device of claim 13, wherein the one or more bank accounts comprise checking accounts, savings accounts, credit or debit card accounts, or other funding mechanisms.

18. The system of claim 1, wherein to verify the identity of the prospective account holder the at least one processor is further configured to:
validate a state identification card, social security card, or passport.

19. The method of claim 7, the verifying the identity of the prospective account holder further comprising:
validating, by the one or more processors, a state identification card, social security card, or passport.

20. The non-transitory computer-readable device of claim 13, the verifying the identity of the prospective account holder further comprising:
validating a state identification card, social security card, or passport.

* * * * *